(12) United States Patent
Shimizu

(10) Patent No.: US 9,329,584 B2
(45) Date of Patent: May 3, 2016

(54) METHOD, SYSTEM AND PROGRAM FOR CONSTRUCTING A CONTROLLER

(75) Inventor: Junya Shimizu, Kangawa (JP)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 13/327,700

(22) Filed: Dec. 15, 2011

(65) Prior Publication Data

US 2013/0158695 A1 Jun. 20, 2013

(51) Int. Cl.
*G06F 19/00* (2011.01)
*G05B 13/04* (2006.01)

(52) U.S. Cl.
CPC .................. *G05B 13/042* (2013.01)

(58) Field of Classification Search
CPC ....................................... G05B 13/042
USPC ....................................... 700/100
See application file for complete search history.

(56) References Cited

U.S. PATENT DOCUMENTS

| 7,403,826 | B2 * | 7/2008 | Aghili et al. | 700/28 |
| 8,170,730 | B2 * | 5/2012 | Shue | 701/10 |
| 8,311,653 | B2 * | 11/2012 | Zhan et al. | 700/29 |
| 8,606,375 | B2 * | 12/2013 | Gahinet et al. | 700/37 |
| 2004/0225383 | A1 * | 11/2004 | Tsai et al. | 700/29 |
| 2008/0125875 | A1 * | 5/2008 | Stewart et al. | 700/20 |
| 2012/0136462 | A1 * | 5/2012 | Shimizu | 700/31 |

FOREIGN PATENT DOCUMENTS

| JP | 10220475 A | 8/1998 |
| JP | 11110003 A | 4/1999 |
| JP | 2002321007 A | 11/2002 |
| JP | 2003345403 A | 12/2003 |
| JP | 2005354774 A | 12/2005 |
| JP | 2008045687 A | 2/2008 |
| JP | 2009205641 A | 9/2009 |

OTHER PUBLICATIONS

Apkarian et al, "Self-scheduled H Control of Linear Parameter-varying Systems: a Design Example", Automatica, vol. 31, No. 9. 1995. pp. 1251-1261.*
Vinnicombe, "Frequency Domain Uncertainty and the Graph Topology", IEEE Transactions on Automatic Control, vol. 38, No. 9, Sep. 1993, pp. 1371-1383.*

(Continued)

*Primary Examiner* — Carlos Ortiz Rodriguez
*Assistant Examiner* — Olvin Lopez Alvarez
(74) *Attorney, Agent, or Firm* — Isaac J. Gooshaw

(57) ABSTRACT

A system, program and related computer implemented method for selecting a controller and constructing it to automate one or more processes is provided. The method comprises the steps of: constructing a controller from a plant described by an LPV model to which a scheduling parameter is given by: a) calculating one or more ν gaps and a mean value of each candidate of a plant parameter vector of said LPV model based on a requirement of preselected constraints; b) choosing a candidate via information gathered by proof based on the magnitude of differences between the ν gaps; c) converting the LPV model into LMI and finding controllers, according to an $H^\infty$ criterion, at all combination end points of a maximum value and a minimum value of the plant parameter vector thus chosen; and d) choosing and constructing said chosen controller for said plant.

6 Claims, 4 Drawing Sheets

(56) References Cited

OTHER PUBLICATIONS

Bruzelius, "Linear Parameter-Varying Systems an approach to gain scheduling" 2004, pp. 167.*

Ambos et al, "Loop Shaping H, Design applied to the Steam Ge.nerator Level Control in EDF Nuclear Power Plants", Sep. 1996, p. 751-756.*

Aubouet et al, "H LPV observer for an industrial semi-active suspension", Jul. 2009, pp. 756-763.*

Scherer, "LPV control and full block multipliers", 2001, pp. 361-375.*

Gatley et al "Robustness analysis of an integrated flight and propulsion control system using the u and the v-gap metric", 2002, pp. 261-275.*

Vinnicombe et al "Algorithms for worst case identifiation in H and in the v gap metric", 2004, pp. 995-1002.*

Gahinet et al "A linear Matrix Inequality Approach to H control", 1994, pp. 31.*

*Alice Corp. Pty. Ltd.* v. *CLS Bank Int'l*, 134 S. Ct. 2347, "Brief for the United States as Amicus Curiae in Support of Respondents", Feb. 2014, pp. 46.*

Gille et al, "H, Control of a Flexible Arm : Coprime Factors Design Using the Gap Metric", 1994, pp. 1317-1322.*

Fialho et al., "Road Adaptive Active Suspension Design Using Linear Parameter-Varying Gain-Scheduling", IEEE Transactions on Control Systems Technology, vol. 10, No. 1, Jan. 2002, pp. 43-54.

Apkarian et. al., "Self-scheduled H∞ Control of Linear Parameter-varying Systems: a Design Example", Automatica, vol. 31, No. 9, pp. 1251-1261, 1995.

Aubouet et al., "H-infinity/LPV Observer for an Industrial Semi-active Suspension", 18th IEEE International Conference on Control Applications, Part of 2009 IEEE Multi-conference on Systems and Control Saint Petersburg, Russia, Jul. 8-10, 2009, pp. 756-763.

Fujimori et. al., "Flight Control Design of Unmanned Space Vehicle Using Gain-Scheduling (Operating Point Selection Using v-Gap Metric and Locally Multi-Objective Gain-Scheduling)", Journal of the Japan Society for Aeronautical and Space Sciences, vol. 51, No. 594, pp. 339-345, 2003.

Vinnicombe et al., "Algorithms for worst case identification in H∞ and in the v gap metric", Automatica 40 (2004), pp. 995-1002, Elsevier.

Vinnicombe, G., "Frequency Domain Uncertainty and the Graph Topology", IEEE Transactions on Automatic Control, vol. 38, Issue: 9, pp. 1371-1383, Sep. 1993.

* cited by examiner

METHOD, SYSTEM AND PROGRAM FOR CONSTRUCTING A CONTROLLER

CROSS REFERENCES

This application claims priority under 35 U.S.C. §119 from Chinese Patent Application No. 2010-264660 filed in Japan, the entire contents of which are incorporated by reference herein.

BACKGROUND OF THE INVENTION

1. Field of the Invention

The present invention relates to a technique for constructing a controller such as a plant of an automobile, and more specifically to a technique for performing gain scheduled control by describing a plant by a linear-parameter variant model and converting the plant into linear matrix inequalities.

2. Description of Background

In conventional prior art methodology, to control a plant in which a constitutive parameter changes during operation, certain methodology is used that introduces variable structure control which performs the controlling function while estimating a state variable by adjusting a gain of an observer by a data map has been employed in many cases.

However, these conventional methods require a lot of efforts especially to incorporate all possibility in a data map. Further, when a map is made experimentally, it is difficult to handle the parameter change of the plant. In view of this, a gain scheduled control, which covers all cases in such a manner that a plant is described by a linear parameter-varying (LPV: Linear Parameter-Varying) model, and a variation range constraint is converted into linear matrix inequalities (LMI: Linear Matrix Inequalities), has been examined as one solution. Nonetheless, in the conventional techniques, the selection of scheduling parameter candidates to obtain sufficient performances was difficult. The selection was human-intensive and required special measures and subjective determination by observing a Bode diagram. This took time and made it difficult to choose the most suitable parameter candidate. The.

Consequently, it is desirable to implement a technique capable of automatically constructing a controller that calculates ν gaps for each candidate of a plant parameter vector. It is desirous that the automatically constructed controller be based on these ν gaps calculated for each candidate of a scheduling parameter vector.

SUMMARY OF THE INVENTION

The shortcomings of the prior art are overcome and additional advantages are provided through the provision of a method, system and program for constructing a controller. In one embodiment, a computer implemented method for selecting a controller from a plurality of controllers and constructing so that it can automate one or more processes used in a plant, comprising the steps of: constructing a controller from a plant described by an LPV model to which a scheduling parameter is given by: a) calculating via a processor one or more ν gaps respectively for Min, Max, and a mean value of each candidate of a plant parameter vector of said LPV model based on a requirement of preselected constraints; b) the processor choosing a candidate via information gathered by proof said plant parameter vector based on the magnitude of differences between the ν gaps; c) the processor converting the LPV model into LMI and finding controllers, according to an $H^\infty$ criterion, at all combination end points of a maximum value and a minimum value of the plant parameter vector thus chosen; and d) the processor choosing and constructing said chosen controller for said plant by using bilinear interpolation weighted by said ν gaps specifically calculated for said plant parameter vector thus chosen.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Some of the concepts of the present invention are described in conjunction with the following exemplary embodiments of the present invention according to the figures as provided. However, it should be understood that these embodiments are intended to provide examples for ease of understanding and therefore should not be used as if intended to limit the scope of the invention. In addition, the figures as will be described, the same numerals are used to indicate the same component or function unless otherwise indicated to the contrary.

Figure 1:
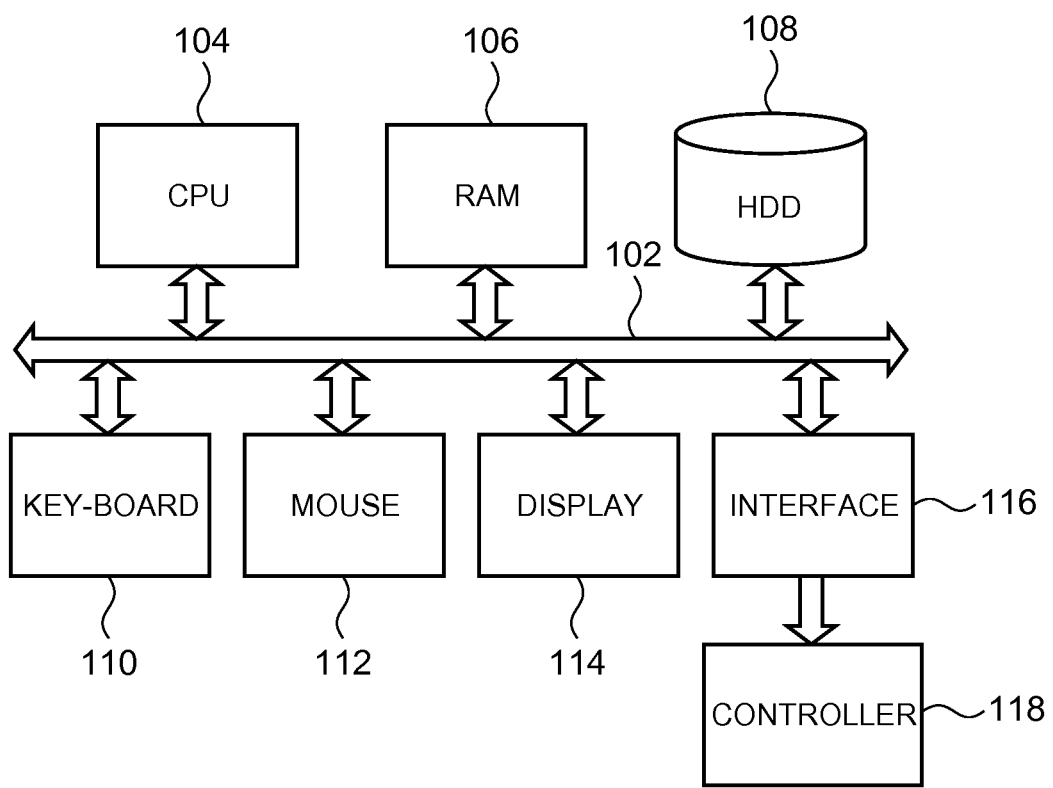
FIG. 1 is a schematic block diagram of one exemplary control computer used in the present invention.

Referring now to FIG. 1, a block diagram of the hardware of a computer is provided comprising a controller 118 according to the present invention is shown. In FIG. 1, a CPU 104, a main memory (an RAM) 106, a hard disk drive (HDD) 108, a key-board 110, a mouse 112, and a display 114 are connected to a system bus 102. The CPU or the central processing unit can comprise one or more processors. Also in alternate embodiments, it is possible that the computing system shown in FIG. 1, comprises one or more other processors enabled to process one or more computing instructions as required by an embodiment of the present invention.

The CPU 104 is preferably based on architecture of 32 bits or 64 bits, and, for example, Pentium (trademark) 4 of Intel Corporation, Core (trademark) 2 DUO of Intel Corporation, Athlon (trademark) of AMD Inc. can be used. The main memory 106 preferably has a capacity of 2 GB or more, more preferably a capacity of 4 GB or more.

Into the hard disk drive 108, though they are not shown individually, an operating system, a processing program according to the present invention, and the like are stored in advance. The operating system may be anything adapting to the CPU 104, such as Linux (trademark), Windows Vista, Windows XP (trademark), and Windows (trademark) 2000, each of which is produced by Microsoft, and Mac OS (trademark) of Apple Computer, Inc.

The key-board 110 and the mouse 112 are used to operate graphic objects such as an icon, a task bar, and a window, which are displayed on the display 114, according to a graphic user interface provided by the operating system. The key-board 110 and the mouse 112 are also used to operate a data recording program, which is described later.

The display 114 is preferably an LCD monitor of 32-bit true color with a resolution of 1024×768 or more, but should not be limited to this. The display 114 is used to display a waveform and the like of operation of a plant by the controller 118. In the hard disk drive 108, an LPV model 204, a scheduling parameter 206 for the LPV model 204, a ν gap-calculation module 208, an LMI conversion module 210, a controller-construction module 212, and a main program 202 to integrate overall processing, all of which will be described later, are stored. The main program 202, the ν gap-calculation module 208, the LMI conversion module 210, and the controller-construction module 212 can be created by any existing programming language such as C, C++, C#, and Java®. These modules are loaded to the main memory 106 by the operation of the operating system as appropriate for execution. Although it is not shown, the main program 202 may display a window for an operator to operate on the display 114 by an appropriate GUI, so that the operator can start or stop a process by using the key-board 110, the mouse 112, and the like.

Figure 4:
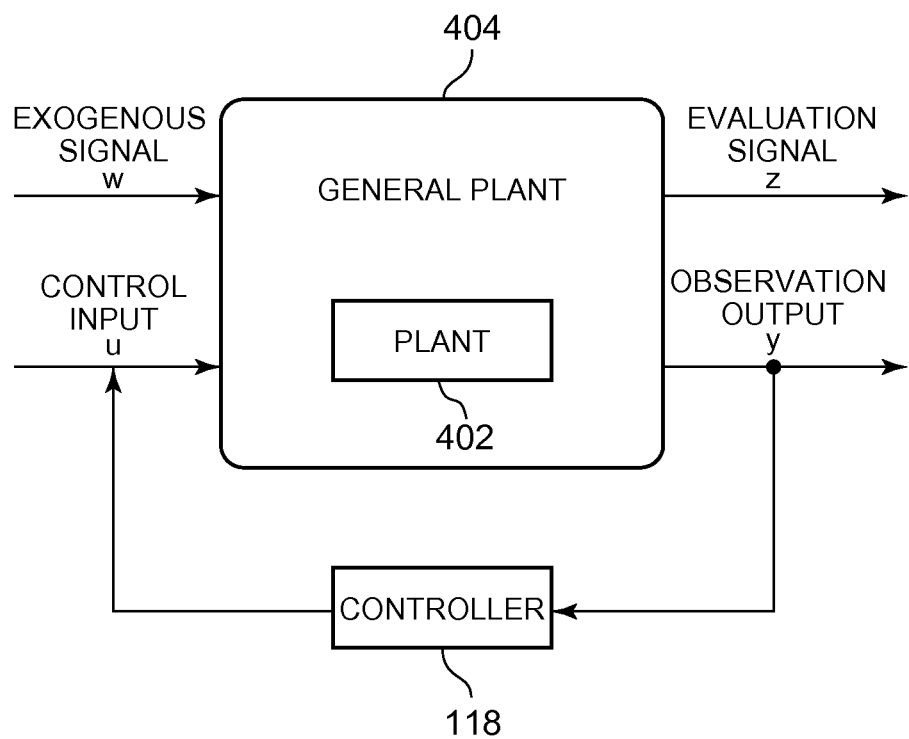
FIG. 4 is a view to describe the derivation of an $H^\infty$ criterion controller by conversion to LMI.

To the bus 102, a controller 118 for controlling a plant 402 shown in FIG. 4 is connected through an appropriate interface board 116 such as PCI or USB. The controller 118 has a register in which to store a control matrix K obtained as a result of calculation through the interface board 116.

Figure 2:
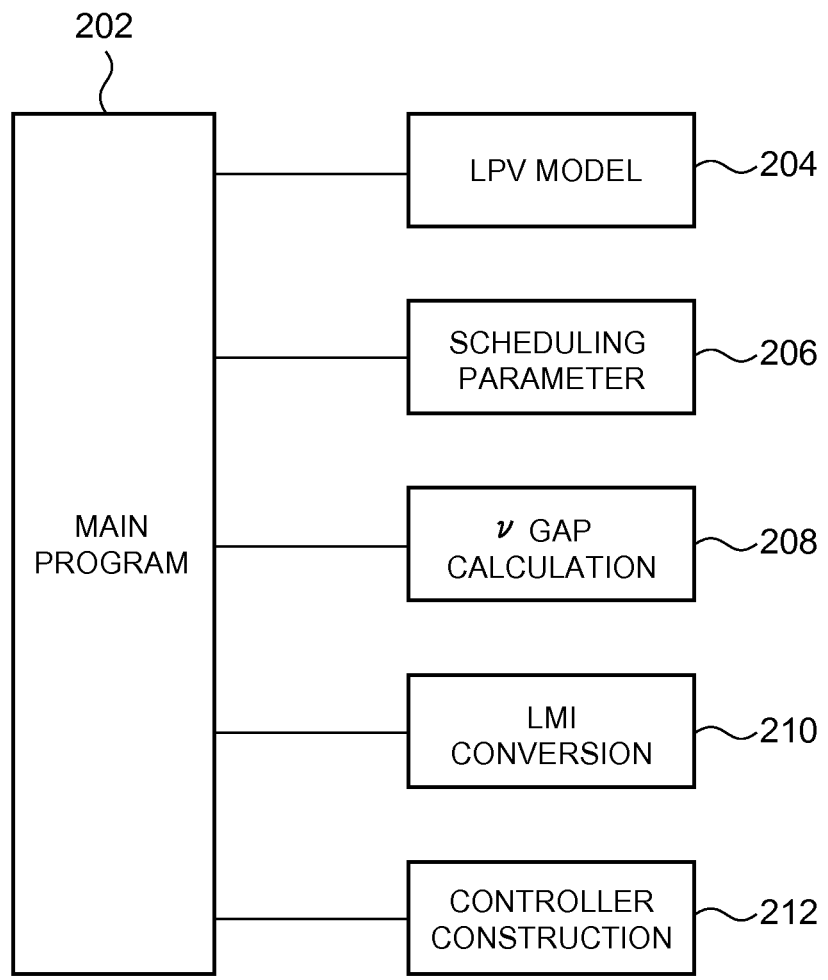
FIG. 2 is a functional block diagram of a program or the like for executing a process of determining a controller according to the present invention.

The plant 402 is, for example, a target mechanism device to be controlled, such as an engine, a brake, or an air conditioner. The plant 402 may be an actual machine, or a software-like model created with simulation modeling tools such as Simulink® and Modelica. When the plant 402 is a software-like model, the plant 402 is a module stored in the hard disk drive 108. In that case, since the controller 118 is also a module stored in the hard disk drive 108, the interface through the interface board 116 is unnecessary. Next will be described a logical construction of a program or the like to execute a process of determining a controller according to the present invention, with reference to a functional block diagram of FIG. 2.

A main program 202 functions to control overall operation including an interface with a user. A linear parameter-varying (LPV) model 204 is a model to describe the plant 402 by the following linear equations, and it is described beforehand by a user in consideration of a mechanics equation and the like.

$$\dot{x}(t) = A(\theta(t))x(t) + B(\theta(t))u(t)$$

$$y(t) = C(\theta(t))x(t) + D(\theta(t))u(t)$$

$$G(s,\theta(t)) = D(\theta(t)) + C(\theta(t))\{sI - A(\theta(t))\}^{-1}B(\theta(t))$$

$$\dot{x}(t) = A(\theta(t))x(t) + B(\theta(t))u(t)$$

$$y(t) = C(\theta(t))x(t) + D(\theta(t))u(t)$$

$$G(s,\theta(t)) = D(\theta(t)) + C(\theta(t))\{sI - A(\theta(t))\}^{-1}B(\theta(t)) \quad \text{[Expression 1]}$$

In this instance A, B, C, and D are coefficient matrices of a state space model.

A scheduling parameter 206 is a time-varying parameter θ(t), which is used in the LPV model 204. As shown in the following expression, the scheduling parameter 206 is a vector of the r dimension.

$$\theta(t) = [\theta_1(t), \ldots, \theta_r(t)]^T \in R^r \quad \text{[Expression 2]}$$

Each element $\theta_j(t)$ (j=1, 2, . . . , r) of θ(t) is described beforehand by the user according to system requirements. Also, for each element $\theta_j(t)$ (j=1, 2, . . . , r) of θ(t), a maximum value $\theta_j^{max}$ and a minimum value $\theta_j^{min}$, which come out of an upper requirement of constraints, are determined beforehand by the user, as shown in the following expression, and they are stored into the hard disk drive 108 as the scheduling parameter 206.

$$\theta_1^{min} \le \theta_1(t) \le \theta_1^{max}, \ldots, \theta_r^{min} \le \theta_r(t) \le \theta_r^{max}. \quad \text{[Expression 3]}$$

A ν gap-calculation module 208 has a function to calculate ν gaps in the method described in G. Vinnicombe, "Frequency Domain Uncertainty and the Graph Topology," IEEE Trans. Automatic Control, Vol. 38, No. 9, pp. 1371-1383, 1993, from a maximum value $\theta_j^{max}$ and a minimum value $\theta_j^{min}$ of the scheduling parameter 206, and a mean value $\theta_j^{mid}$ therebetween. Note that the mean value $\theta_j^{mid}$ is calculated as follows:

$$\theta_j^{mid} = \frac{\theta_j^{min} + \theta_j^{max}}{2} \quad \text{[Expression 4]}$$

$$(j = 1, 2, \ldots, r).$$

A linear-matrix-inequality (LMI) conversion module 210 has a function to convert the LPV model 204 into LMI, and to find controllers according to an H∞ criterion by use of a maximum value and a minimum value of a chosen scheduling parameter.

A controller-construction module 212 constructs the controller 118 for a generalized plant by bilinear interpolation weighted by the ν gaps calculated when the parameter is chosen. At this time, the construction of the controller 118 is carried out through the interface board 116 shown in FIG. 1.

Figure 3:
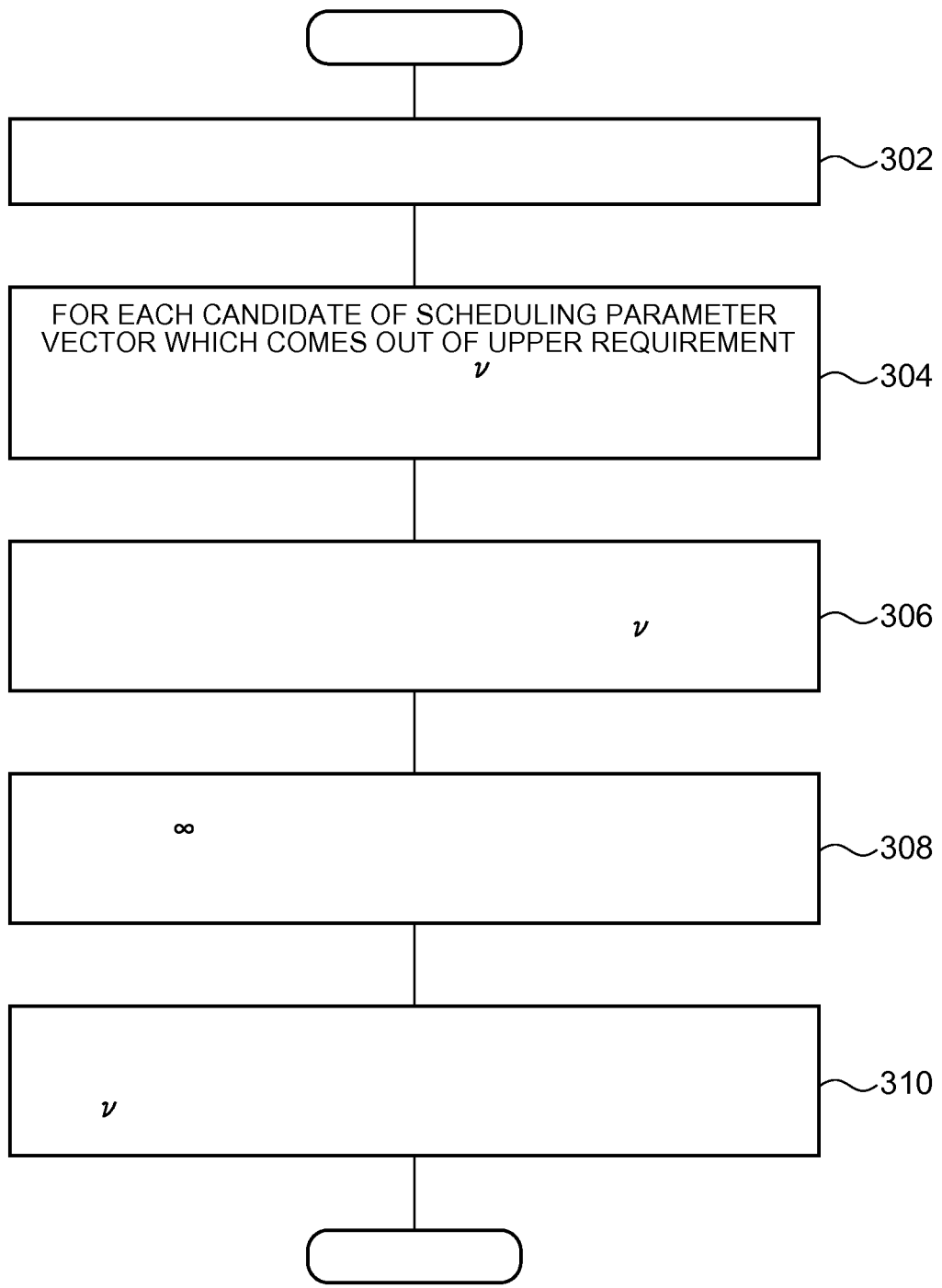
FIG. 3 is a view showing a flowchart for executing a process of determining a controller according to the present invention.

With reference to the flowchart in FIG. 3, the following describes a process of determining a controller according to the present invention. In FIG. 3, in Step 302, a user describes an LPV model and also gives a scheduling parameter and the number of elements thereof. At this point, maximum values and minimum values of the elements of the scheduling parameter are also inputted according to a specification. They are independently stored in the hard disk drive 108 as the LPV model 204 and the scheduling parameter 206 of FIG. 2 by the main program 202.

In Step 304, the main program 202 accesses the ν gap-calculation module 208, so that a ν gap is calculated for each of Min, Max, and a mean value thereof of each candidate of the scheduling parameter vector coming out of an upper requirement of the constraints, in accordance with, for example, the method described in G. Vinnicombe, "Frequency Domain Uncertainty and the Graph Topology," IEEE Trans. Automatic Control, Vol. 38, No. 9, pp. 1371-1383, 1993.

At first, a general calculation of the ν gap is described. When transfer functions of two plant models are assumed $P_1(j\omega)$ and $P_2(j\omega)$, the $\nu$ gap between the two transfer functions is defined as the following expression. Here, $\omega$ is an angular frequency.

Further, $$\delta_\nu(P_1, P_2) = \sup_\infty \kappa(P_1(j\omega), P_2(j\omega)) \quad \text{[Expression 5]}$$

Here, $\kappa(X, Y)$ is defined as follows:

$$\kappa(X,Y) = \overline{\sigma}[(I+YY^*)^{-1/2}(Y-X)(I+XX^*)^{-1/2}] \quad \text{[Expression 6]}$$

$$\overline{\sigma} \quad \text{[Expression 7]}$$

represents a maximum singular-value. If it is a single-input single-output system, the $\nu$ gap is calculated as follows:

$$\delta_\nu = \sup_\infty \frac{|P_2(j\omega) - P_1(j\omega)|}{\sqrt{1+|P_1(j\omega)|^2}\sqrt{1+|P_2(j\omega)|^2}}. \quad \text{[Expression 8]}$$

Here, in terms of the i-th element ($i=1,\ldots,r$) of $\theta$, a transfer function into which a maximum value thereof is substituted is assumed $T_i^{max}$, and a transfer function into which a minimum value thereof is substituted is assumed $T_i^{min}$. Further, a transfer function into which a mean value therebetween is substituted is assumed $T_i^{mid}$.

In this instance, the main program 202 accesses the $\nu$ gap-calculation module 208 to calculate the following values by use of the above $\nu$ gap calculation expression.

$$\nu_{i\_mid\_max} = \delta_\nu(T_i^{mid}, T_i^{max})$$

$$\nu_{i\_min\_mid} = \delta_\nu(T_i^{min}, T_i^{mid})$$

$$\nu_{i\_min\_max} = \delta_\nu(T_i^{min}, T_i^{max})$$

In Step 306, the main program 202 sequentially takes those elements as scheduling parameter candidates in the order from i with a largest value of ($|\nu_{i\_min\_mid} - \nu_{i\_mid\_max}| + \nu_{i\_min\_max}$) ($i=1,\ldots,r$), and chooses as many elements as the number of parameters that is initially given.

In the first embodiment, only a first given parameter is chosen, and in the second embodiment, a subsequently given parameter is also chosen. The first embodiment and the second embodiment will be described later.

In Step 308, the main program 202 accesses the LMI conversion module 210 to convert the LPV model 204 into LMI and to derive an $H^\infty$ criterion controller. At first, the generalization thereof is described. That is, a fluctuation portion of the LPV model 204 is taken as an exogenous signal. Then, a large plant for it is assumed and defined as a generalized plant 404 as shown in FIG. 4. If it is determined which parameter of the LPV model 204 is chosen as a scheduling parameter, an internal filter of the exogenous signal and the exogenous signal itself can be automatically determined from the frequency characteristic of the fluctuation portion thus chosen.

In view of this, from the viewpoint that it is a control aim to suppress a controlled variable z as small as possible to an exogenous signal w in the generalized plant 404 that can be represented by the following expression:

$$\begin{bmatrix} x \\ y \end{bmatrix} = G \begin{bmatrix} w \\ u \end{bmatrix} = \begin{bmatrix} G_{11} & G_{12} \\ G_{21} & G_{22} \end{bmatrix} \begin{bmatrix} w \\ u \end{bmatrix}, \quad \text{[Expression 9]}$$

a controller K that makes a transfer function $G_{zw}$ therebetween small is designed. Here, the transfer function $G_{zw}$ is represented by the following expression:

$$G_{zw} = G_{11} + G_{12}K(I - G_{22}K)^{-1}G_{21} \quad \text{[Expression 10]}$$

As a measure of the magnitude of this $G_{zw}$, an $H^\infty$ norm is used. This is an $H^\infty$ criterion. The definition thereof is as follows:

$$\|G_{zw}\|_\infty = \sup_\infty \overline{\sigma}(G_{zw}(j\omega)). \quad \text{[Expression 11]}$$

Here, $$\overline{\sigma} \quad \text{[Expression 12]}$$

represents a maximum singular-value, and $\omega$ represents an angular frequency. By this definition, the $H^\infty$ control problem can internally stabilize a closed loop system by a feedback control of $u=Ky$ with respect to a generalized plant G. In the meantime, with respect to a given positive number $\gamma$, the $H^\infty$ control problem can be formulated to obtain a controller K that satisfies the following expression:

$$\|G\|_\infty < \gamma. \quad \text{[Expression 13]}$$

Here, $\gamma$ may be given optionally, but as a conventional technique, there is a method in which $\gamma$ may be determined automatically. One approach to solve this is a technique according to LMI. That is, when only parts corresponding to z and w are taken out and assumed as follows:

$$\dot{x} = Ax + Bw$$

$$z = Cx + Dw, \quad \text{[Expression 14]}$$

Figure 5:
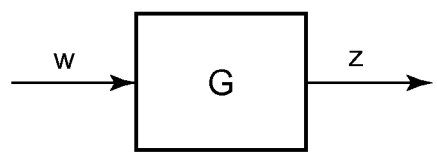
FIG. 5 is a view to describe the conversion from a generalized plant to an LMI problem.

The following two conditions are equivalent according to a certain theorem. (i) A matrix A is stable, and in the block shown in FIG. 5, the following expression is formed:

[Expression 15]

$$\|G\|_\infty < \gamma$$

(ii) There exists $X>0$, which satisfies the following expression:

$$X > 0, \quad \begin{bmatrix} XA + A^T X & XB & C^T \\ B^T X & -\gamma I & D^T \\ C & D & -\gamma I \end{bmatrix} < 0. \quad \text{[Expression 16]}$$

In other words, the condition (i) is the aforementioned $H^\infty$ criterion, and a matrix X that satisfies the $H^\infty$ criterion is a controller. Further, when a solution that satisfies linear matrix inequalities (LMI) about X in the condition (ii) is found, a controller based on the $H^\infty$ standard is obtained.

Generally, in the case of a feedback control, even if variables are just substituted as they are, this does not make a linear for X. Therefore, a change of the variables or the like is performed so as to make the above form. As for the technical details thereof, S. Aubouet et al., "H-infinity/LPV observer for an industrial semi-active suspension," IEEE Proc. Conf. on Control Applications, pp. 756-763, 2009, can be also referred to as appropriate.

On the other hand, w cannot be inputted with respect to all the scheduling parameters. In view of this, in Step 308, the main program 202 calculates controllers at end points according to the $H^\infty$ criterion using the LMI by use of the LMI conversion module 210. Then, in Step 310, the main program 202 constructs a controller for a generalized plant by bilinear interpolation weighted by the ν gaps calculated when the parameter is chosen.

Note that, in the conventional technique, it has been implicitly assumed that the controller K for a generalized plant can be expressed by affine transformation as follows:

$$K = \sum_{i=1}^{N} p_i K^{(i)}, \; \sum_{i=1}^{N} p_i = 1. \quad \text{[Expression 17]}$$

Here, $K^{(i)}$ is the i-th controller.

It is one of the characteristics of the present invention that this is replaced to the bilinear interpolation weighted by ν gaps calculated when a parameter is chosen, as follows:

$$K = \sum_{i=1}^{N} q_i K^{(i)}, \; \sum_{i=1}^{N} q_i = 1, \; q_i = \frac{v_i p_i}{\sum_{i=1}^{N} v_i p_i}. \quad \text{[Expression 18]}$$

How many parameters are chosen as N is different between the embodiments. In the first embodiment, only a first given parameter is chosen. That is, with respect to the parameter, a controller is constructed by bilinear interpolation where $K^{(1)}$ is assumed a controller fixed to min, $K^{(2)}$ is assumed a controller fixed to max, $v_1$ is assumed a ν gap between transfer functions respectively fixed to min and mid, $v_2$ is assumed a ν gap between transfer functions respectively fixed to mid and max, and $p_1$ and $p_2$ are given as the following expressions:

$$p_1 = \frac{\theta_1(t) - \theta_1^{min}}{\theta_1^{max} - \theta_1^{min}}, \; p_2 = 1 - p_1. \quad \text{[Expression 19]}$$

In the second embodiment, two parameters, i.e., a first given parameter and a subsequent parameter are chosen. That is, with respect to those parameters, a controller is constructed by bilinear interpolation where a controller designed at an end point of {p1_min, p2_min} is assumed $K^{(1)}$, a controller designed at an end point of {p1_min, p2_max} is assumed $K^{(2)}$, a controller designed at an end point of {p1_max, p2_min} is assumed $K^{(3)}$, a controller designed at an end point of {p1_max, p2_max} is assumed $K^{(4)}$, a ν gap between transfer functions respectively fixed to p1_min and p2_min is assumed $v_1$, a ν gap between transfer functions respectively fixed to p1_min and p2_max is assumed $v_2$, a ν gap between transfer functions respectively fixed to p1_max and p2_min is assumed $v_3$, a ν gap between transfer functions respectively fixed to p1_max and p2_max is assumed $v_4$, and $p_1, p_2, p_3,$ and $p_4$ are given as the following expressions:

$$p_1 = \frac{(\theta_1(t) - \theta_1^{min})(\theta_2(t) - \theta_2^{min})}{(\theta_1^{max} - \theta_1^{min})(\theta_2^{max} - \theta_2^{min})} \quad \text{[Expression 20]}$$

$$p_2 = \frac{(\theta_1(t) - \theta_1^{min})(\theta_2^{max} - \theta_2(t))}{(\theta_1^{max} - \theta_1^{min})(\theta_2^{max} - \theta_2^{min})}$$

$$p_3 = \frac{(\theta_1^{max} - \theta_1(t))(\theta_2(t) - \theta_2^{min})}{(\theta_1^{max} - \theta_1^{min})(\theta_2^{max} - \theta_2^{min})}$$

$$p_4 = \frac{(\theta_1^{max} - \theta_1(t))(\theta_2^{max} - \theta_2(t))}{(\theta_1^{max} - \theta_1^{min})(\theta_2^{max} - \theta_2^{min})}.$$

The use of weighting by the ν gaps rather than the linear interpolation according to the characteristic of the present invention takes into consideration a geodesic distance of the non-Euclidean geometry, thereby lowering the error of the feedback control.

Note that such an embodiment in which three or more parameters may be chosen to construct a controller can be considered. However, it is desirable to keep the number of parameters to choose within a proper number, because when the number of parameters to choose is so large, a controller may be complicated and may not function in some cases.

The embodiments of the present invention have been described as above, but it will be understandable for a person skilled in the art that the present invention is not limited to a platform such as specific hardware or software, but is realizable on any given platform.

DESCRIPTION OF REFERENCE NUMERALS

102 System Bus
104 CPU
106 Main Memory
108 Hard Disk Drive
114 Display
116 Interface Board
118 Controller
202 Main Program
204 LPV Model
206 Scheduling Parameter
208 Gap-calculation Module
210 Conversion Module
212 Controller-construction Module
402 Plant
404 Generalized plant

What is claimed is:

1. A method of constructing a controller, the method comprising: receiving a first plant parameter vector for a plant described by a linear parameter-varying (LPV) model and a first candidate for use in the first plant parameter vector;
determining for the first candidate a minimum value, a maximum value and a mean value based on a set of predetermined constraints;
automatically, by a processing device, calculating a first plurality of ν gap values based upon values of the first plant parameter vector;
selecting, by the processing device, the first plant parameter vector from a plurality of plant parameter vector candidates and based, at least in part, on a magnitude of differences between the first plurality of ν gap values;
converting the LPV model to linear matrix inequalities (LMI) to find a solution that satisfies an $H^\infty$ criterion; and
constructing a first controller, based, at least in part, upon the $H^\infty$ criterion, the first plant parameter vector, the first plurality of ν gap values and bilinear interpolation weighted by the first plurality of ν gap values;
wherein the first plurality of ν gap values include: (i) a first ν gap value based on the minimum value and the maximum value, (ii) a second ν gap value based on the minimum value and the mean value, and (iii) a third ν gap value based upon the mean value and the maximum value.

2. The method of claim 1 further comprising:
using the first controller to control a first plant.

3. The method of claim 1 wherein the selection of the first plant parameter vector is based on a maximum value and a minimum value for each plant parameter vector of the plurality of plant parameter vector candidates.

4. The method of claim 1 further comprising: using the first controller to control a first plant.

5. A method comprising:
receiving a first plant parameter vector, from a plurality of plant parameter vector candidates, for a plant described by a linear parameter-varying (LPV) model and a plurality of candidates for use in the first plant parameter vector;
for each candidate, determining a minimum value, a maximum value and a mean value based on a set of predetermined constraints;
automatically, for each candidate and by a processing device, calculating the following v gap values: (i) a first v gap value based on the minimum value and the maximum value, (ii) a second gap value based on the minimum value and the mean value, and (iii) a third v gap value based upon the mean value and the maximum value;
selecting a selected candidate from the plurality of candidates based, at least in part, on a magnitude of differences between the v gap values;
converting the LPV model to linear matrix inequalities (LMI) to find a solution that satisfies an $H^\infty$ criterion; and
constructing a first controller, based, at least in part, upon the $H^\infty$ criterion, the selected candidate, the v-gap values, and bilinear interpolation weighted by the first plurality of v gap values.

6. The method of claim 5 wherein the selection of the first plant parameter vector is based on a maximum value and a minimum value for each plant parameter vector of the plurality of plant parameter vector candidates.

* * * * *